United States Patent [19]
Arnold

[11] Patent Number: 5,213,202
[45] Date of Patent: May 25, 1993

[54] HELICALLY GROOVED CONVEYOR PULLEY FOR USE IN BELTED CONVEYOR SYSTEMS

[75] Inventor: D. Brink Arnold, Anthony, Kans.

[73] Assignee: Morrison Marketing, Inc., Anthony, Kans.

[21] Appl. No.: 771,545

[22] Filed: Oct. 7, 1991

[51] Int. Cl.⁵ .............................................. B65G 23/04
[52] U.S. Cl. ...................................... 198/835; 198/842
[58] Field of Search ................ 198/835, 842, 840, 817

[56] References Cited

U.S. PATENT DOCUMENTS

| | | | |
|---|---|---|---|
| 2,847,114 | 8/1958 | Orr | 198/840 X |
| 3,122,935 | 3/1964 | Morling | 198/840 |
| 3,661,246 | 5/1972 | Faunce et al. | 198/842 X |
| 3,713,348 | 1/1973 | Conrad et al. | 74/240 |
| 3,812,732 | 5/1974 | Conrad | 74/240 |
| 3,859,865 | 1/1975 | Conrad | 74/241 |
| 3,972,414 | 8/1976 | Conrad | 198/840 X |
| 4,140,216 | 2/1979 | Conrad | 198/840 X |
| 4,428,282 | 1/1983 | Anstey | 100/87 |
| 4,470,591 | 9/1984 | Acquaviva | 198/817 X |
| 4,592,463 | 6/1986 | Puskar | 198/840 X |
| 4,832,186 | 5/1989 | Conrad | 198/840 |
| 5,011,060 | 4/1991 | Cramer | 198/840 X |

FOREIGN PATENT DOCUMENTS

| | | | |
|---|---|---|---|
| 974920 | 9/1975 | Canada | 198/840 |
| 948676 | 9/1956 | Fed. Rep. of Germany | 198/840 |

Primary Examiner—D. Glenn Dayoan
Attorney, Agent, or Firm—Arnold, White & Durkee

[57] ABSTRACT

According to the present invention, an improved conveyor or roller pulley is provided. A preferred embodiment of the invention comprises a roll core, having a lagging material attached thereto, with a multiplicity of longitudinally spaced drive surfaces, with helical grooves, formed in said lagging, adjacent which are tapered shoulder regions.

17 Claims, 2 Drawing Sheets

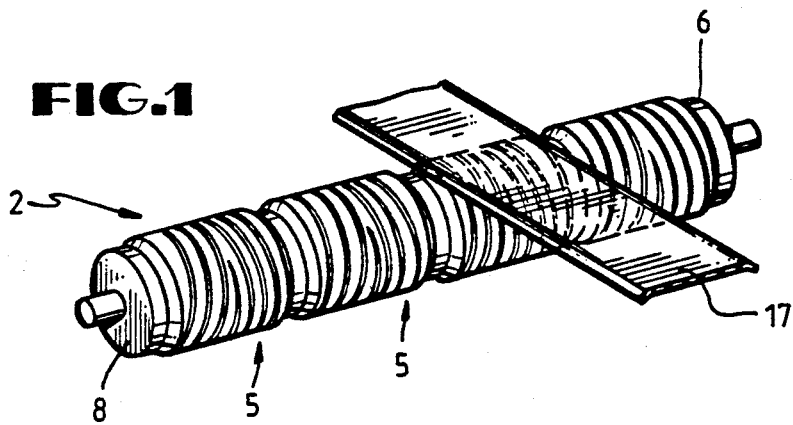
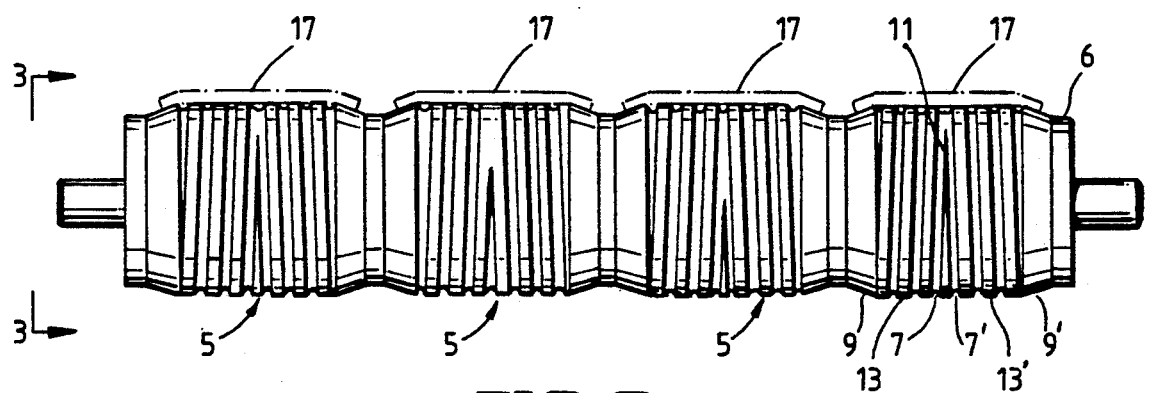
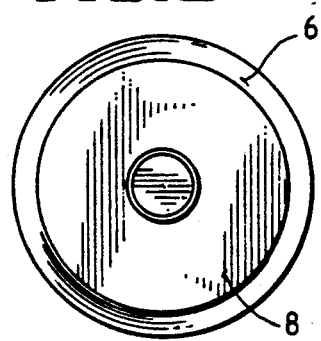
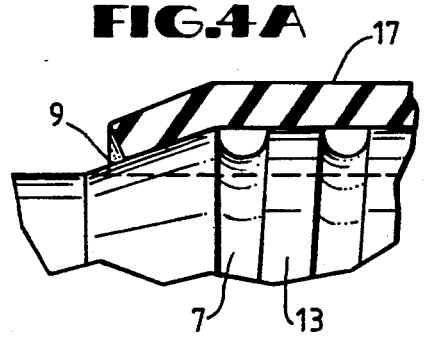

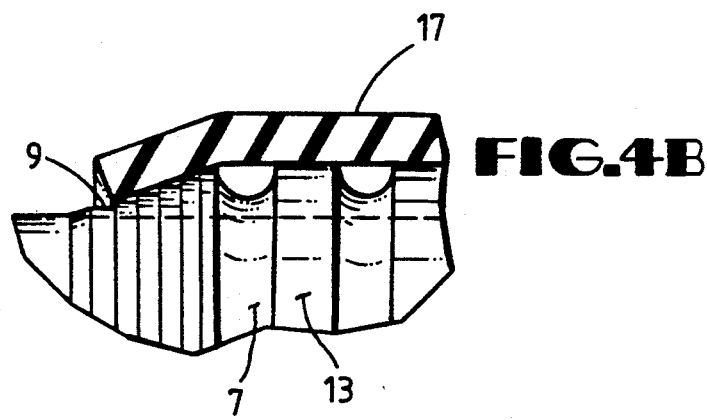
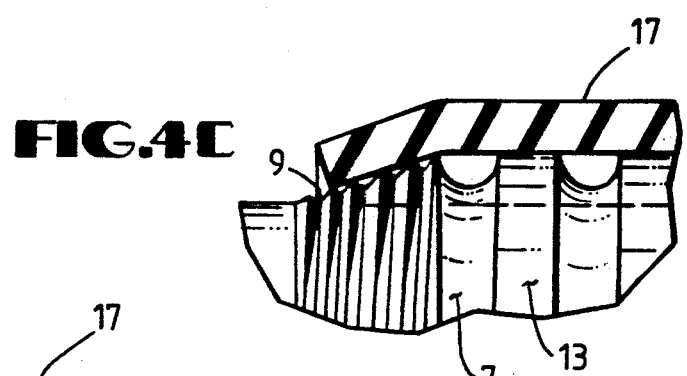
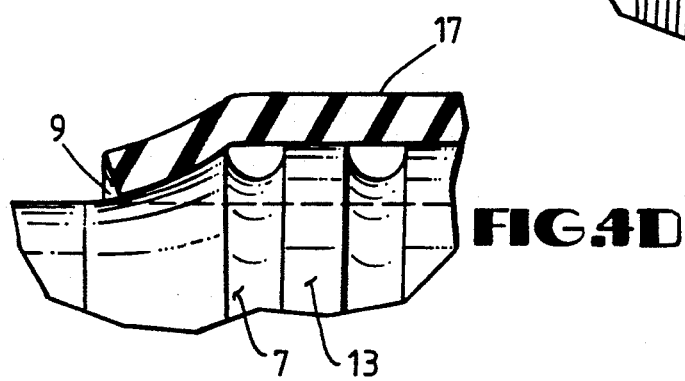
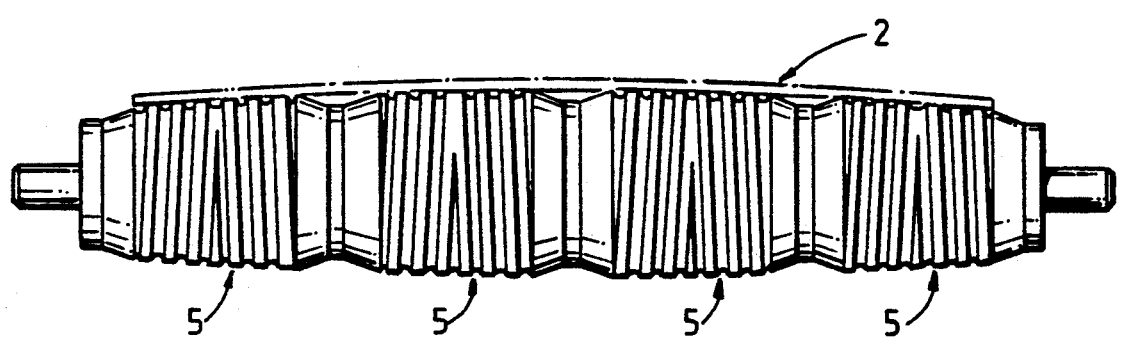

HELICALLY GROOVED CONVEYOR PULLEY FOR USE IN BELTED CONVEYOR SYSTEMS

BACKGROUND OF THE INVENTION

1. Technical Field

This invention relates to drive and idler pulleys generally used in belted conveyor systems and, in particular, to a conveyor pulley with helical grooving formed in the surface of the pulley.

2. Description of the Related Art

In operation, the typical belted conveyor system uses a multiplicity of both drive and idler rollers or pulleys. Generally speaking, the drive rollers or pulleys are the means by which force is applied to the belts within the system, thereby causing movement of the belts as they carry various materials throughout the system. The idler rollers or pulleys are generally used to provide support for the belts in the system. The idler pulleys are also generally capable of being adjusted in such a manner as to increase or decrease the tension of the belts within the system, thereby enhancing the ability of the drive pulleys to move the belt and to reduce belt wear.

For the purpose of the present description, the terms "pulley" and "roller" may be used interchangeably. In general, however, the term "pulley" will be employed with the understanding that the term also embraces "rollers."

Conveyor pulleys can be covered with an multitude of materials that are attached by various methods. This covering, referred to as lagging, is used to: (1) increase the coefficient of friction between the conveyor pulley and the belt, (2) reduce the wear on the conveyor pulley face and the conveyor belt, (3) effect a self-cleaning action on the surface of the belt and pulley, and (4) improve the tracking of the belt. The most commonly used lagging is made of elastomeric compounds, which are bonded and cured by vulcanization, to the pulley core and extend around the pulley. Other common methods of attaching the lagging materials to the pulley include bolting, painting, cementing, and spraying. Lagging thickness can vary from a few thousandths of an inch, as with sprayed-on coatings, to a considerable thickness, as with some solid rubber vulcanized coatings.

In belted conveyor systems, belt slippage, caused by insufficient energy transfer between the drive and idler pulleys and the belts, reduces the operational performance of the belts. Additionally, material accumulation on the surface of the drive or idler pulleys or the belt surface has a detrimental effect on the tracking capability of the belt and often increases slippage between the pulleys and the belt.

Some prior art conveyor pulleys have attempted to solve the mis-tracking problem by crowning the face of the pulley. Crowning, as that term is generally understood in the art, refers to the shape or diameter profile of the pulley. However, in belted conveyor systems, in which a single pulley member supports one or more individual belts, it has been found that multiple crowned rollers do not aid in the tracking of the belts. In fact, a multiple crowned roller has been found to be detrimental to tracking, where the belt width is relatively narrow (less than about 12 inches) and the transverse stiffness of the belt is greater than the longitudinal stiffness of the belt, and where the longitudinal modulus of elasticity of the belt is considered high relative to the actual operating tension of the particular application.

All of the above referenced problems, i.e. tracking, traction, and trash accumulation, result in inefficient operation of belted conveyor systems. In a worst case scenario, operations must be stopped while belts are cleaned, repaired or replaced at great expense to the user of the belted conveyor system. There is therefore a continuing need for a conveyor pulley which can more effectively deal with the above-referenced problems.

SUMMARY OF THE INVENTION

The present invention addresses several general problems present in existing belted conveyor systems and, in particular, those problems occasioned by the use of prior art pulleys with chevron or herringbone groove designs formed in the face of the conveyor pulley. The present invention provides a single pulley adapted for use in multiple belt conveyor systems, such as agricultural equipment, e.g., round hay balers, and forest products handling equipment, especially equipment used to handle wet pulp material. The chevron and herringbone pulleys of the prior art have been limited to use with single belts. Additionally, the tapered shoulder regions of the present invention allow for improved removal of moisture and debris buildup from the belt and/or pulley, thereby decreasing belt slippage and increasing belt life.

The present invention also improves the tracking characteristics of belted conveyor systems. The prior art chevron and herringbone pulleys have been designed to increase the traction between the belts and the pulley and offer little or no assistance in increasing the tracking performance of the belt during operation. In contrast, the present invention provides greater tracking in addition to improved traction performance of the conveyor system without the detrimental belt wear occasioned by use of the more aggressive chevron and herringbone designs of the prior art pulleys.

The present invention addresses the above-referenced problems with a pulley wherein the drive surface is comprised of a set of opposed helical grooves apexed at their juncture. The helical groove pattern of the invention is characterized by a leading edge which is longer than the leading edges of the chevron and herringbone designs. This greater length of leading edge promotes greater tracking and traction performance, as well as reduced belt wear and improved cleaning and trash removal.

Alongside each drive surface of a pulley of the invention, there is preferably a tapered shoulder region which slopes down toward the pulley core, i.e., the central shaft. Preferably, the drive surface is also narrower than the belt which it engages, such that the edges of the belt mold around the edges of the drive surface and ride along the tapered shoulder regions.

The drive surfaces or faces of the pulleys of the invention may be substantially flat faced or crowned, and tapered shoulder regions are preferably provided adjacent each drive surface. The crowning of the drive surfaces may be such that each individual drive surface is individually crowned to a given radius. Alternatively, the individual drive surfaces may be crowned collectively on the same overall radius, thereby providing a pulley with one overall radius for use in single belt applications. In lieu of opposing helical grooves formed in the face of the drive surface, opposed helical ribs of material may be applied to, or formed on, the drive surface or roll core itself.

The drive surface, being preferably narrower than the belt with which it is in contact, concentrates the energy transmission provided by a drive pulley to the belt. The opposing helical grooves in the drive surfaces, whether they be flat or crowned, have the effect of centering the belt at the helix apex during the operation. The helical grooves tend to neutralize any sideways movement of the belt along the grooved drive surface by aggressively increasing the radial friction coefficient due to the grooves and due to the angle at which the grooves are formed in the drive surfaces of the pulley. The grooving also serves the function of cleaning both the belt and the flat or crowned drive surface of the pulley from the apex outward toward the outer belt edges.

Another feature of the improved pulley is that the grooves act as both wipers and channels in removing debris from the surface of the pulley and the belt. As the belt comes in contact with the pulley surface, the pulley surface preferably tends to deflect, thus resulting in the storage of energy in the form of compression of the pulley surface. Then, as the surface of the belt separates from contact with the pulley surface, the compression is released, and the pulley surface regains its original position. The flexing of the grooves during this compression-decompression cycle enhances the removal of trash accumulated on the belt surface and/or in the grooves in the pulley surface. Since the grooves have an outlet to the tapered shoulder region of the pulley, they also act as channels for removal of moisture and debris from the belt and/or pulley.

As mentioned earlier, the pulleys of the invention preferably have tapered shoulder regions adjacent to the drive surfaces. The tapered shoulder regions act as trash and moisture removal channels, and they also provide a surface to which the edges of a belt are able to conform or mold during operation. During operation, the tensile loads on conventional belts are concentrated, and thus more severe, on the outer edges of the belts. In contrast to the present invention, conventional belt designs have not allowed for dynamic stress relief of the outer edges. The slope of the tapered shoulder regions of the invention should preferably be equal to or greater than the rate of load deformation of the belt at dynamic loading. Typically, the slope (rise over run) of the tapered shoulder regions, which are substantially linear in cross section, is in the range of 0.1 to 0.25, with 0.25 (¼" rise in 1" of run) being the slope of the tapered shoulder region on a preferred embodiment of the present invention. Additionally, the tapered shoulder regions can be substantially curvilinear in cross section, i.e., nonlinear, as could be accomplished by grinding or cutting.

Despite the advantages of the tapered shoulder regions, it should be recognized that the tapered shoulder regions are not absolutely required to be adjacent to each drive surface. In fact, in both single and multiple belt conveyor systems, some or all of the tapered shoulder regions may be eliminated. In this case, however, the invention may tend to serve its intended functions somewhat less efficiently.

The present invention is particularly useful in high moisture conditions. Generally speaking, moisture acts as a lubricant between a pulley and a belt. However, current conveyor pulley designs do not provide an effective means for moisture removal. In contrast, the opposing helical grooves of the invention wipe moisture from the surface of a belt and also provide a channel in which the moisture is conveyed to the tapered shoulder regions. Thus, by decreasing the moisture between a belt and its drive pulley, belt slippage is decreased, with attendant increases in belt life and performance. The opposed helical grooves effectively reduce the lubricating effect of the moisture by removing the moisture from the traction areas.

BRIEF DESCRIPTION OF THE DRAWINGS

Other objects and advantages of the invention will become more apparent upon reading the following detailed description and upon reference to the drawings in which:

FIG. 1 is a perspective view of an embodiment of the present invention with a representative belt used in conjunction with the present invention shown therein;

FIG. 2 is a side view of an embodiment of the invention which contains a multiplicity of helically grooved drive surfaces;

FIG. 3 is an end view of the embodiment of FIG. 1, as viewed from line 3—3 in FIG. 1;

FIG. 4A is an enlarged, partially sectioned view of the embodiment of the invention as shown in FIG. 2 having a substantially linear tapered shoulder region;

FIG. 4B is a partially sectioned, fragmental, side view of an embodiment of the present invention having a stepped tapered shoulder region;

FIG. 4C is a partially sectioned, fragmental, side view of an embodiment of the present invention having a grooved tapered shoulder region;

FIG. 4D is a partially sectioned, fragmental, side view of an embodiment of the present invention having a gradually curving tapered shoulder region; and FIG. 5 is a side view of an embodiment of the present invention wherein the multiplicity of drive surfaces of the present invention are all crowned, as a unit, to the same radius.

It should be understood, however, that this specification is not intended to limit the invention to the particular forms disclosed herein, but on the contrary the invention is to cover all modifications, equivalents, and alternatives falling within the spirits and scope of the invention, as defined by the appended claims.

DESCRIPTION OF THE PREFERRED EMBODIMENTS

Referring to FIG. 1, there is shown a conveyor pulley 2 for handling a plurality of belts 17, a representative one of which is shown therein. Thus, the pulley comprises a plurality of drive surfaces or faces 5 spaced along and extending around core 8. The pulley is broken at two points to indicate the possible presence of still further pulley faces than those actually shown.

Referring to FIG. 2 and FIG. 3, the drive surfaces 5 are formed in a lagging material 6, which is attached to the core 8. As stated earlier, the lagging may be attached in a variety of ways, including vulcanizing, bonding, welding, cementing, or spraying. In a preferred embodiment, cured rubber or polyurethane lagging is vulcanized to an aluminum or steel roll core. The lagging is selected to improve the ability of the pulley and the belt to engage one another with reduced slippage, thereby increasing belt life.

The overall thickness of the lagging material is a matter of environmental conditions, design choice and manufacturing ability. However, it is generally contemplated that the lagging thickness should normally range between 0.25 inches and approximately 2 inches. However, the aforementioned thicknesses should not be considered as limitations of the present invention, as it is readily apparent that the present invention will function properly regardless of the lagging thickness. In a preferred embodiment of the present invention, the overall thickness of the lagging is approximately 0.625", but this thickness is not considered to be a critical element of the invention.

Additionally, it should be understood that the present invention also encompasses pulleys that have helical grooving and tapered shoulder regions formed directly in the roll core, thereby avoiding the use of lagging altogether. By way of example only, this may be accomplished by using a roll core of solid rubber or urethane.

Opposed helical grooves 7 and 7' are formed in each drive surface 5 and extend from tapered shoulders 9 and 9' to a common apex 11. As shown in FIGS. 4A, 4B, 4C and 4D, the grooves, in cross section, have generally vertical sidewalls and a radius formed in the base of the groove and are separated by thread-like members or lands 13 and 13'. For example, in a preferred embodiment, the conveyor pulley of the present invention, having an outer roll surface diameter of approximately 7 inches, the bottom radius is approximately 0.188 inches and the sidewalls of the grooves are approximately 0.188 inches in length, i.e., nominally $\frac{3}{16}$" wide by $\frac{3}{16}$" deep. Both the radius and length of the sidewalls vary in direct proportion to the diameter of the pulley. However, it should be understood that the present invention is not to be considered limited by this exact ratio of pulley diameter to groove depth/sidewall length. On the contrary, the specifies above disclosed represent a preferred embodiment of the invention. The relative sizes and shapes of the grooves and the lands may vary considerably, e.g., "V" shaped, "U" shaped, or flat bottomed grooves, etc. However, it is generally contemplated that the lands will be at least as wide as the grooves and preferably wider. In a preferred embodiment of the invention, the grooves are approximately $\frac{3}{8}$" wide by $\frac{3}{8}$" deep and are on $1\frac{1}{8}$" centers, which results in lands of approximately $\frac{3}{4}$" in width, i.e., a 2:1 ratio of land width to groove width. However, this ratio may vary in range from 1.0 to 5.0 depending upon the particular requirements of the specific application, and should not be considered to be a specific limitation of the present invention.

The pitch or rate of advance of the grooves may also vary considerably. In a preferred embodiment of the present invention, the pitch of the helical grooves is 5°±1° as measured from a line extending circumferentially around the pulley that passes through the apex 11 of the grooves. In general, it is desirable that the size and pitch of the grooves be such as to urge a belt toward the center of its drive surface and also provide a channel for helping to keep the pulley face and the belt clean and dry.

Tapered shoulder regions 9 and 9' are preferably formed along each side of each drive surface 5 and extend toward the core 8. As shown in FIG. 4A, the tapered shoulder regions are substantially linear in cross section. However, as shown in FIGS. 4B, 4C, and 4D, the tapered shoulder regions may also be stepped, grooved or generally curvilinear in cross section. Hereinafter, when the tapered shoulder region is referred to as being curvilinear in cross section it should be understood that the term curvilinear is meant to encompass the specific embodiments disclosed in FIGS. 4B-4D as well as any tapered shoulder region that is nonlinear in cross section.

The lagging, if used, may be applied in such a manner as to either completely cover the roll core 8 between the tapered shoulder regions or, alternatively, applied in such a manner that the area of the roll core between the tapered shoulder regions is exposed to the environment, i.e., not covered. The width of each drive surface 5 is preferably chosen to be less than that of its respective belt 17, such that the edges of the belt overhang and conform to the shoulders 9 and 9'. This arrangement not only further helps to center a belt on its pulley, it also improves belt-life by relieving stresses at the edges of a belt.

As shown in FIG. 2, each drive surface 5 is substantially flat. It will be recognized, however, that each of the individual drive surfaces may be crowned, cambered or tapered to have a generally higher central crown. Furthermore, as shown in FIG. 5, the plurality of drive surfaces may be collectively crowned to a common overall radius.

As suggested earlier, the pulleys and their lagging components may be formed of a number of materials. Thus, the core of a pulley may be made of a variety of materials, such as steel, plastic, bronze, aluminum, and wood. Similarly, lagging materials may include elastomers such as natural rubber, synthetic rubber, polyurethane, neoprene, or other similar type materials. In general, it is desirable that a lagging material be wear-resistant but also resilient and elastic so as to possess a spring-like quality in engaging and disengaging from a belt.

In operation, a grooved pulley of the present invention provides several attractive features. As stated earlier, the helical threads or lands formed between the helical grooves of the pulley act to help center a belt on the pulley. In addition, the grooves, being continuous from the center of a pulley to its edges, act as channels to convey fluid and particles away from the pulley and its belt.

I claim:

1. A conveyor pulley for use in belted conveyor systems, comprising:
   a roll core; and
   a lagging material affixed to said roll core, said lagging material having an outer surface and at least one drive surface formed therein, said drive surface comprising opposed helical grooves formed in said lagging material thereby establishing lands on the outer surface of said lagging material adjacent said grooves, said lands being at least as wide as said grooves.

2. A conveyor pulley, as set forth in claim 1, wherein said lagging material includes a plurality of drive surfaces distributed along the roll core.

3. A conveyor pulley, as set forth in claim 2, which further comprises a tapered shoulder region adjacent at least one side of at least one of said drive surfaces.

4. A conveyor pulley, as set forth in claim 1, wherein said drive surface is substantially flat in cross section.

5. A conveyor pulley, as set forth in claim 1, wherein said drive surface is crowned in cross section.

6. A conveyor pulley, as set forth in claim 3, wherein said tapered shoulder region is substantially linear in cross section.

7. A conveyor pulley, as set forth in claim 3, wherein said tapered shoulder region is substantially curvilinear in cross section.

8. A conveyor pulley for use in belted conveyor systems, comprising:
a roll core;
a lagging material affixed to said roll core;
said lagging material having an outer surface and a plurality of drive surfaces formed therein, said drive surfaces being spaced longitudinally along said pulley;
each of said drive surfaces comprising opposed helical grooves formed in said lagging material thereby establishing lands on the outer surface of said lagging material adjacent said grooves, said lands being at least as wide as said grooves; and
a tapered shoulder region adjacent at least one side of at least one of said drive surfaces.

9. A conveyor pulley, as set forth in claim 8, wherein at least one of said drive surfaces is substantially flat in cross section.

10. A conveyor pulley, as set forth in claim 8, wherein at least one of said drive surfaces is crowned in cross section.

11. A conveyor pulley, as set forth in claim 8, wherein said tapered shoulder region is substantially linear in cross section.

12. A conveyor pulley, as set forth in claim 8, wherein said tapered shoulder region is substantially curvilinear in cross section.

13. A conveyor pulley for use in belted conveyor systems, comprising:
a roll core;
a lagging material affixed to said roll core;
said lagging material having an outer surface and a plurality of drive surfaces formed therein, said drive surfaces being spaced longitudinally along said pulley;
each of said drive surfaces comprising opposed helical grooves formed in said lagging material, thereby establishing lands on the outer surface of said lagging material adjacent said grooves, said lands being twice as wide as said grooves; and
a tapered shoulder region adjacent each side of said drive surfaces.

14. A conveyor pulley, as set forth in claim 13, wherein at least one of said drive surfaces is substantially flat in cross section.

15. A conveyor pulley, as set forth in claim 13, wherein at least one of said drive surfaces is crowned in cross section.

16. A conveyor pulley, as set forth in claim 13, wherein said tapered shoulder regions are substantially linear in cross section.

17. A conveyor pulley, as set forth in claim 13, wherein said tapered shoulder regions are substantially curvilinear in cross section.

* * * * *